US010180845B1

(12) United States Patent
Nunes (10) Patent No.: US 10,180,845 B1
(45) Date of Patent: Jan. 15, 2019

(54) SYSTEM AND METHODS FOR NETWORK BOOTING

(71) Applicant: Ivanti, Inc., South Jordan, UT (US)

(72) Inventor: Joseph Nunes, South Jordan, UT (US)

(73) Assignee: Ivanti, Inc., South Jordan, UT (US)

( * ) Notice: Subject to any disclaimer, the term of this patent is extended or adjusted under 35 U.S.C. 154(b) by 0 days.

(21) Appl. No.: 14/992,774

(22) Filed: Jan. 11, 2016

Related U.S. Application Data (60) Provisional application No. 62/254,928, filed on Nov. 13, 2015.

(51) Int. Cl.
| | | |
|---|---|---|
| G06F 15/177 | (2006.01) | |
| G06F 9/4401 | (2018.01) | |
| H04L 29/08 | (2006.01) | |
| H04L 12/741 | (2013.01) | |

(52) U.S. Cl.
CPC ............ *G06F 9/4416* (2013.01); *H04L 45/74* (2013.01); *H04L 67/02* (2013.01); *G06F 9/4406* (2013.01)

(58) Field of Classification Search
CPC ........ G06F 9/4416; H04L 45/74; H04L 67/02
USPC .......................................................... 713/2
See application file for complete search history.

(56) References Cited

U.S. PATENT DOCUMENTS

| | | | |
|---|---|---|---|
| 6,167,567 A | 12/2000 | Chiles et al. | |
| 6,223,209 B1 * | 4/2001 | Watson | H04L 29/06 709/201 |
| 6,345,294 B1 * | 2/2002 | O'Toole | G06K 13/0825 709/222 |
| 6,507,869 B1 * | 1/2003 | Franke | H04L 29/12018 709/220 |
| 6,611,850 B1 | 8/2003 | Shen | |
| 7,363,480 B1 * | 4/2008 | Righi | G06F 8/65 709/219 |
| 8,275,895 B1 * | 9/2012 | Ellis | H04L 63/168 709/227 |
| 9,465,600 B2 | 10/2016 | Matthew et al. | |
| 2002/0078188 A1 * | 6/2002 | Anand | G06F 9/4416 709/222 |
| 2003/0005276 A1 * | 1/2003 | French | G06F 9/4416 713/2 |
| 2003/0009657 A1 * | 1/2003 | French | H04L 41/0213 713/2 |
| 2003/0163583 A1 * | 8/2003 | Tarr | H04L 29/06 709/245 |

(Continued)

OTHER PUBLICATIONS

Office Action for U.S. Appl. No. 14/256,809, dated Nov. 2, 2016, 14 pages.

(Continued)

*Primary Examiner* — Jaweed A Abbaszadeh
*Assistant Examiner* — Volvick Derose (57) ABSTRACT

A method for network booting by a preboot execution environment (PXE) proxy is described. The method includes receiving one or more boot service discovery protocol (BSDP) packets from a client device. The method also includes determining a bootable image file to provide to the client device based on characteristics of the client device received in the one or more BSDP packets. The method further includes determining a nearest network location of the bootable image file. The method additionally includes providing the nearest network location of the bootable image file to the client device.

22 Claims, 7 Drawing Sheets

(56) References Cited

U.S. PATENT DOCUMENTS

| | | |
|---|---|---|
| 2003/0163702 A1 | 8/2003 | Vigue et al. |
| 2004/0093400 A1* | 5/2004 | Richard ............ H04L 29/12264 709/222 |
| 2004/0107242 A1* | 6/2004 | Vert ..................... H04L 67/104 709/203 |
| 2005/0010663 A1* | 1/2005 | Tatman .................. H04L 67/16 709/224 |
| 2005/0198388 A1 | 9/2005 | Teodosiu et al. |
| 2007/0074019 A1 | 3/2007 | Seidel |
| 2007/0101135 A1* | 5/2007 | Saba ....................... G06F 21/88 713/168 |
| 2007/0198819 A1* | 8/2007 | Dickens ............... G06F 9/4416 713/1 |
| 2007/0266120 A1* | 11/2007 | Tallieu ................. G06F 9/4416 709/220 |
| 2008/0130639 A1 | 6/2008 | Costa-Requena et al. |
| 2008/0133650 A1 | 6/2008 | Saarimaki et al. |
| 2008/0229089 A1* | 9/2008 | Assouad ............... H04L 41/085 713/2 |
| 2008/0313450 A1* | 12/2008 | Rosenberg ........... G06F 9/4416 713/2 |
| 2009/0094352 A1* | 4/2009 | Sharma ................ G06F 9/4416 709/220 |
| 2009/0106549 A1 | 4/2009 | Mohamed |
| 2009/0125569 A1* | 5/2009 | Achtermann ..... G06F 17/30212 |
| 2009/0271595 A1* | 10/2009 | Barsness ............... G06F 9/5066 712/229 |
| 2010/0332579 A1 | 12/2010 | Sengupta et al. |
| 2011/0071841 A1 | 3/2011 | Fomenko et al. |
| 2011/0185047 A1 | 7/2011 | Vaidyanathan et al. |
| 2011/0276671 A1* | 11/2011 | Cain ..................... G06F 9/4416 709/222 |
| 2011/0320800 A1* | 12/2011 | Azam ................... G06F 9/4416 713/2 |
| 2012/0005321 A1* | 1/2012 | Hu ....................... H04L 12/6418 709/222 |
| 2012/0072723 A1 | 3/2012 | Orsini et al. |
| 2012/0158876 A1 | 6/2012 | She |
| 2012/0164974 A1 | 6/2012 | Eriksson et al. |
| 2013/0145042 A1* | 6/2013 | Sen ................... H04L 29/06027 709/239 |
| 2013/0198332 A1* | 8/2013 | Van Ackere ...... H04L 29/12018 709/217 |
| 2014/0095605 A1 | 4/2014 | Varvello et al. |
| 2014/0172783 A1* | 6/2014 | Suzuki ...................... G06F 8/63 707/609 |
| 2015/0106608 A1* | 4/2015 | Brundidge ................ G06F 1/26 713/2 |
| 2015/0178096 A1* | 6/2015 | Inbaraj .................. G06F 9/4416 713/2 |
| 2015/0186668 A1 | 7/2015 | Whaley et al. |
| 2015/0256345 A1 | 9/2015 | Vaid et al. |
| 2016/0202964 A1* | 7/2016 | Butcher .................... G06F 8/65 717/172 |

OTHER PUBLICATIONS

Office Action for U.S. Appl. No. 14/256,809, dated May 17, 2017, 14 pages.

Office Action for U.S. Appl. No. 14/332,733, dated Dec. 30, 2016, 10 pages.

Office Action for U.S. Appl. No. 14/332,733, dated Jun. 27, 2016, 6 pages.

Office Action for U.S. Appl. No. 14/332,737, dated May 20, 2016, 8 pages.

Office Action for U.S. Appl. No. 14/332,737, dated Sep. 20, 2016, 9 pages.

Office Action for U.S. Appl. No. 14/332,737, dated Feb. 10, 2017, 11 pages.

Office Action for U.S. Appl. No. 14/332,737, dated Aug. 8, 2017, 12 pages.

Office Action for U.S. Appl. No. 14/256,809, dated Jan. 26. 2018, 21 pages.

Office Action for U.S. Appl. No. 14/332,733, dated Dec. 29, 2017, 5 pages.

* cited by examiner

SYSTEM AND METHODS FOR NETWORK BOOTING

RELATED APPLICATIONS

This application is related to and claims priority from U.S. Provisional Patent Application Ser. No. 62/254,928, filed Nov. 13, 2015, for "SYSTEM AND METHODS FOR NETWORK BOOTING."

TECHNICAL FIELD

The present disclosure generally relates to computers and computer-related technology. More specifically, the present disclosure relates to systems and methods for network booting.

BACKGROUND

The use of computing devices has become increasingly prevalent in modern society. As the cost of computing devices has declined and as the usefulness of computing devices has increased, people are using them for a wide variety of purposes. For example, many people use computing devices to perform work tasks as well as to seek entertainment. One type of computing device is a computer.

Computer technologies continue to advance at a rapid pace. Computers commonly used include everything from hand-held computing devices to large multi-processor computer systems. These computers include software operating systems and applications that include user interfaces, in order to make them useful and accessible to an end user. Computers are increasingly linked with other computers through networks. With the expansion of computer technology, the size of networks has continued to increase. Networks may link computers together that are a great distance apart.

One of the challenges involved with computers is network booting. A computing device may not have an operating system stored in local memory. Instead, the computing device may acquire the operating system from an image file on network sources. A challenge in network booting is providing the correct image file in a distributed network environment. As can be observed from this discussion, systems and methods that make network booting more time efficient and less burdensome may be beneficial to the end user and the management of a computer network.

DETAILED DESCRIPTION

A method for network booting by a preboot execution environment (PXE) proxy is described. The method includes receiving one or more boot service discovery protocol (BSDP) packets from a client device. The method also includes determining a bootable image file to provide to the client device based on characteristics of the client device received in the one or more BSDP packets. The method further includes determining a nearest network location of the bootable image file. The method additionally includes providing the nearest network location of the bootable image file to the client device.

The method may also include sending a boot loader to the client device using Trivial File Transfer Protocol (TFTP).

Providing the nearest location of the bootable image file may include performing domain name system (DNS) resolution on behalf of the client device to determine the internet protocol (IP) address of the nearest network location of the bootable image file. The IP address of the nearest network location of the bootable image file may be sent to the client device. The nearest network location may be a hypertext transfer protocol (HTTP) server or a network file system (NFS) server that hosts the bootable image file and has a shortest ping time from the PXE proxy.

The bootable image file may be a netboot image file. The client device may be a Macintosh client. The PXE proxy may be a Windows operating system device.

Determining a bootable image file to provide to the client device may include querying a web service to determine one of a plurality of bootable image files that is mapped to the characteristics of the client device. The method may also include determining that the PXE proxy needs to update a boot loader for the mapped bootable image file. The method may further include acquiring an updated boot loader from a nearest network location.

The method may additionally include sending, to the client device, a response that the mapped bootable image file is available. The response may include a full path to the mapped bootable image file.

A PXE proxy that is configured for network booting is also described. The PXE proxy includes a processor, memory in electronic communication with the processor and instructions stored in the memory. The instructions are executable by the processor to receive one or more BSDP packets from a client device. The instructions are also executable to determine a bootable image file to provide to the client device based on characteristics of the client device received in the one or more BSDP packets. The instructions are further executable to determine a nearest network location of the bootable image file. The instructions are additionally executable to provide the nearest network location of the bootable image file to the client device.

A non-transitory tangible computer-readable medium for network booting by a PXE proxy is also described. The computer-readable medium includes executable instructions for receiving one or more BSDP packets from a client device. The instructions are also executable to determine a bootable image file to provide to the client device based on characteristics of the client device received in the one or more BSDP packets. The instructions are further executable to determine a nearest network location of the bootable image file. The instructions are additionally executable to provide the nearest network location of the bootable image file to the client device.

One of the challenges involved with computers is network booting. A computing device may boot using an image file provided by a server. Image files may be different, depending on the operating system used by a client. One technology used to perform network booting is netboot (also referred to as NetBoot), which may be used to perform network booting of Macintosh® computers.

Netboot images cannot support all hardware. As a result certain hardware platforms are disallowed from using certain netboot images. New hardware needs newer netboot images and older hardware needs older netboot images.

There are two situations that arise because of this scenario. Since both hardware and operating systems are continually being produced and released there is a need for additional hardware and netboot image support than what can be sent as a static configuration file or setting. Also, most systems need to have multiple netboot images defined. It is up to the creator of the task and/or the person requesting that the netboot process run to determine which netboot image to boot. As can be seen from this discussion, systems and methods that make the netboot process automatic may be beneficial to the end user and the management of a computer network.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

Figure 1:
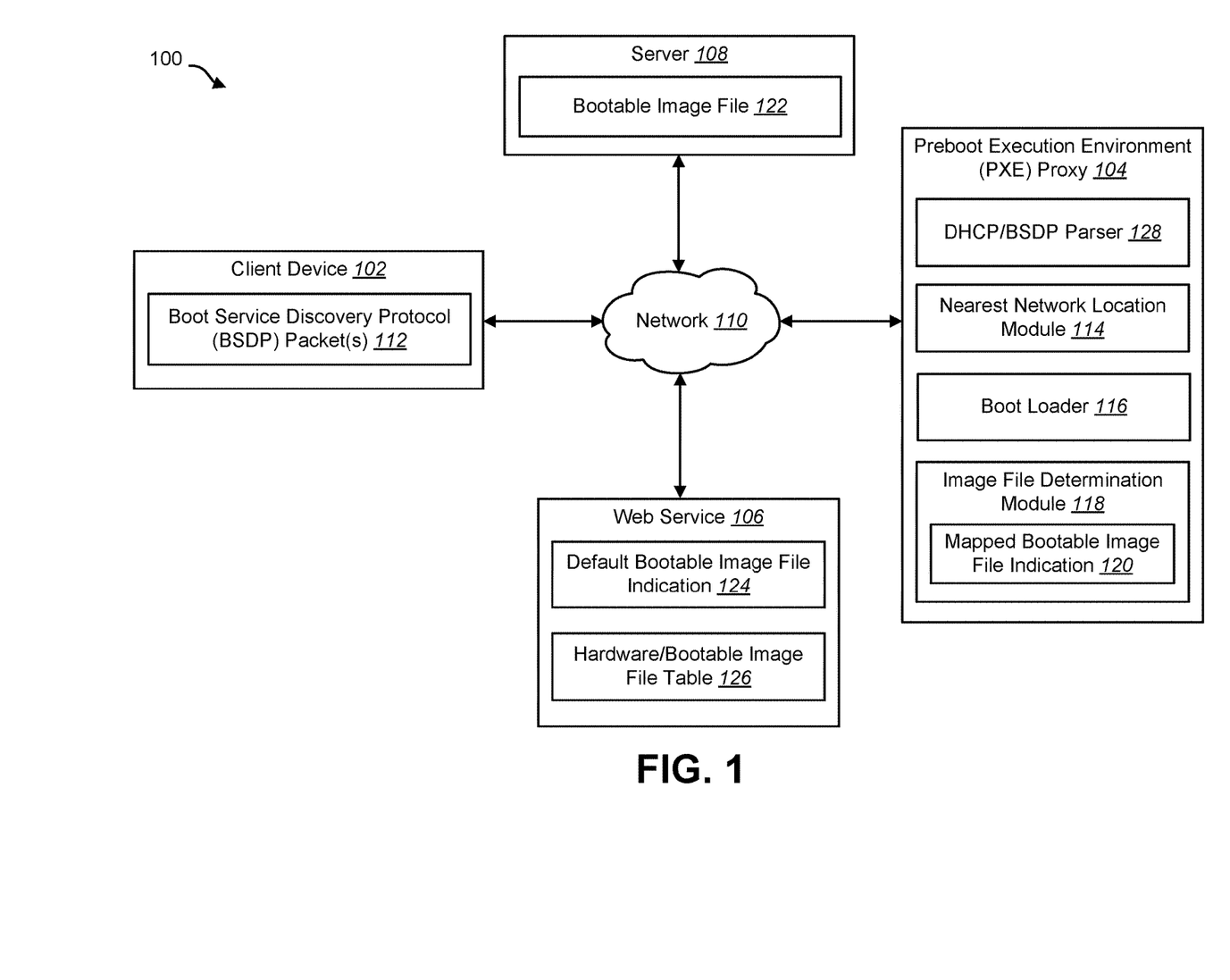
FIG. 1 is a block diagram illustrating one configuration of a system for network booting.

FIG. 1 is a block diagram illustrating one configuration of a system 100 for network booting. The system 100 may include a plurality of electronic devices that are in electronic communication with one another via a network 110. The network 110 may include one or more Local Area Networks (LANs), Wide Area Networks (WANs), Wireless Wide Area Networks (WWAN), Wireless Local Area Networks (WLANs), the Internet, etc. The system 100 may include one or more of a client device 102, a preboot execution environment (PXE) proxy 104, a web service 106 and a server 108 that may communication with each other via the network 110.

The client device 102 may be a desktop computer, laptop computer, tablet computer, smartphone, printer, etc. The client device 102 is a computing device that is configured to run an operating system (OS). In an implementation, the client device 102 may be computer that is configured to run the Apple® Macintosh® (Mac) operating system (Mac OS). For example, the client device 102 may be a Macintosh® computer.

The client device 102 may be configured to perform network booting. As used herein, network booting is the process of booting a client device 102 from the network 110 rather than a local drive on the client device 102. Booting (also referred to as booting up) is an initialization process in which the client device 102 is turned on (e.g., electrical power is supplied to the CPU of the client device 102) or restarted and the client device 102 performs actions to enter a runtime environment. As part of the booting process, the client device 102 may load an operating system (e.g., Mac OS).

In a network booting scenario, the client device 102 may not have an OS installed in local memory. Instead, the client device 102 may acquire a bootable image file 122 from a remote source. The client device 102 may load a bootable image file 122 to install the OS and enter a runtime environment. In an implementation, the bootable image file 122 may be a netboot image file that may be loaded by a Mac client.

To implement network booting, the client device 102 may utilize the boot service discovery protocol (BSDP) protocol. The client device 102 may send one or more BSDP packets 112 to attempt to identify a network source for a bootable image file 122. The BSDP packets 112 may be an extension to Dynamic Host Configuration Protocol (DHCP) packets.

One problem with network booting is that BSDP packets 112 are blocked at the subnet level. For example, BSDP packets 112 sent by the client device 102 may be blocked by routers and gateways in the network 110. Therefore, if there are multiple locations in a network 110, multiple setups are needed for each location (e.g., subnet).

In the context of a client device 102 that runs Mac OS, the most common setup is to have a Mac OS server on each subnet that can facilitate network booting by the client device 102. With this approach, settings must be replicated across servers (often manually) or complex network settings must be created for every disparate network segment to be managed. The first option requires a large investment in infrastructure and management. The second option requires changing settings to every network segment, in addition to requiring a process that is designed to be local to need to go over segregated LAN and sometimes even WAN links. Furthermore, there is no central control for managing these servers.

To facilitate network booting on a client device 102 that runs Mac OS, some files are transmitted through trivial file transfer protocol (TFTP), and other files are through hypertext transfer protocol (HTTP) or network file system (NFS). In an approach, this may be done using a Mac OS server. With this approach, it is required to either configure an independent Mac OS server on each subnet or configure DHCP forwarders so that DHCP traffic can cross subnet and virtual local area network (VLAN) boundaries.

In addition to Mac OS server being expensive and not heavily used in enterprise environments except for netboot operations, there is an underlying problem that many enterprises do not allow non-server-class hardware to provide services that the enterprise will depend on. Apple does not make server-class hardware so those environments are not allowed to utilize Apple products as servers for network booting.

Another challenge with network booting a client device 102 that runs Mac OS is determining which bootable image file 122 to provide the client device 102. In the context of Mac OS, a single netboot image file cannot support all hardware. For example, in Mac OS there is no concept of simply adding drivers to make a netboot image more portable. As a result, certain hardware platforms are disallowed from using certain netboot image files. New hardware needs newer images and older hardware needs older netboot image files. Keeping netboot image files up to date traditionally requires updating and copying netboot files to various servers (e.g., 1 server per subnet) and making appropriate changes to each server individually.

Because both hardware and OSes are frequently being produced and released, there is a need for additional hardware and bootable image files 122 to be supported than what can be provided in a static configuration file or setting. An enterprise may have multiple bootable image files 122 defined, and it is up to the creator of the task or the person requesting that the network booting process run to determine which bootable image file 122 to boot. For example, traditional netboot processes require listing many (e.g., 2-4)

netboot images and relying on technicians or end users to select the correct netboot image. Furthermore, changes in the traditional netboot process require updating and configuring many netboot servers, which may result in inconsistencies across servers because of mistakes or forgetting to make changes.

The systems and methods described herein provide for network booting across multiple network locations with minimal configuration using devices that are already likely to be in the environment rather than a dedicated server. The systems and methods described herein further provide for centrally managed decision making for the bootable image file 122 within a distributed network environment.

The PXE proxy 104 may be a computing device that offers PXE services. The PXE proxy 104 may be located within the same subnet as the client device 102. In an implementation, the PXE proxy 104 may be a computing device that runs a Windows® OS, Unix OS or Linux OS. The PXE proxy 104 may include a multicast trivial file transfer protocol (MTFTP) service for providing files to the client device 102.

The PXE proxy 104 may receive the one or more BSDP packets 112 sent by the client device 102. BSDP packets 112 are an extension to DHCP packets. Similarly, PXE packets are also DHCP-based packets. The PXE proxy 104 may take advantage of the similarities between BSDP packets 112 and PXE packets to listen for and respond to BSDP packets 112.

The one or more BSDP packets 112 sent by the client device 102 may include characteristics about the client device 102. In an implementation, the characteristics included in the BSDP packets 112 include the hardware configuration of the client device 102.

The PXE proxy 104 may facilitate network booting on the client device 102. The PXE proxy 104 may include a DHCP/BSDP parser 128. Although BSDP and PXE both utilize DHCP packets, they are completely different in terms of process flow and instruction set. The DHCP/BSDP parser 128 may interpret the BSDP packets 112 and may present them in a format that is readable by the PXE proxy 104.

Upon receiving the one or more BSDP packets 112, the DHCP/BSDP parser 128 may interpret the BSDP packets 112 to determine that the client device 102 is requesting network booting. The DHCP/BSDP parser 128 may obtain the characteristics of the client device 102 from the BSDP packets 112. Using these characteristics, the PXE proxy 104 may determine which bootable image file 122 should be provided to the client device 102.

The complete bootable image file 122 may be too large for the PXE proxy 104 to send to the client device 102 using TFTP. A netboot image may be presented as a single large file, and that is how Mac OS may display it. In reality, a netboot image is a folder with a series of files. These files (along with the necessary services to serve the file) may be split across different devices (e.g., servers 108) to provide scalability, ease of configuration, and intelligent bandwidth usage.

The bootable image file 122 may be sent to the client device 102 using hypertext transfer protocol (HTTP) or network file system (NFS). However, to improve scalability and minimize size, the PXE proxy 104 may not have an HTTP or NFS service. Instead, one or more other servers 108 on the network 110 may provide HTTP and/or NFS services.

A server 108 may host the bootable image file 122. The server 108 may be any device on the network 110 that can serve up HTTP or NFS. The bootable image file 122 may be a complete image (e.g., netboot image) or one or more files from the image. While a single server 108 is shown in FIG. 1, a network 110 may include multiple servers 108 that host the bootable image file 122. The server 108 may be a hypertext transfer protocol (HTTP) server or a network file system (NFS) server. The server 108 may or may not be located on the same subnet as the PXE proxy 104 and the client device 102. The server 108 may provide both content replication (to manage the files at the remote locations) and the ability to redirect the client download to the nearest location.

The PXE proxy 104 may include a nearest network location module 114. The PXE proxy 104 may be configured with a list of servers 108 that host the bootable image file 122. The nearest network location module 114 may determine a nearest network location of the bootable image file 122 for the client device 102. In an implementation, the PXE proxy 104 may send a ping to the servers 108 that host the bootable image file 122. The server 108 that has the shortest ping time from the PXE proxy 104 is considered the nearest network location for the bootable image file 122.

A client device 102 without an OS or management agent cannot contact the server 108. The client device 102 does not know the network location (e.g., internet protocol (IP) address) of the server 108. The PXE proxy 104 may provide the nearest network location of the bootable image file 122 to the client device. In an implementation, the PXE proxy 104 may perform domain name system (DNS) resolution on behalf of the client device 102 to determine the internet protocol (IP) address of the nearest network location of the bootable image file 122. The PXE proxy 104 may send the IP address of the nearest network location of the bootable image file 122 to the client device 102. Therefore, the client device 102 may receive the IP address of the nearest server 108 with the bootable image file 122 on an HTTP or NFS share.

The PXE proxy 104 may provide a boot loader 116 to the client device 102. A boot loader 116 (also referred to as a bootloader or a boot manager) is a program that places the OS of a computer into memory. The PXE proxy 104 may send the boot loader 116 to the client device 102 using TFTP.

Using the IP address of the server 108, the client device 102 may obtain the bootable image file 122 from the server 108. For example, the client device 102 may download the bootable image file 122 using either HTTP or NFS. The client device 102 may use the boot loader 116 provided by the PXE proxy 104 to load the bootable image file 122 into memory. The client device 102 may finish the network booting by installing an OS and entering a runtime environment.

By using this approach, a client device 102 using the Mac OS may perform network booting with no more infrastructure than what is usually already on a subnet: a PXE proxy 104 and a server 108 using HTTP or NFS shares. This provides a lightweight infrastructure for network booting. This is instead of an individually managed Apple® server on each subnet, or a single Apple® server trying to serve up an entire organization using complex DHCP forwarding rules on the network 110. This approach allows for a client device 102 using the Mac OS to be imaged even without a dedicated (or shared) Apple® server OS. Furthermore, administrators do not need to learn a whole new set of technologies to begin imaging Apple® devices in their environment. Additionally, since the PXE proxy 104 takes care of all the underlying complexity of trying to network boot a client device 102 using the Mac OS, this approach does not require an administrator or end user to understanding the network booting process.

As described above, upon receiving the one or more BSDP packets 112, the PXE proxy 104 may determine a bootable image file 122 to provide to the client device 102 based on characteristics of the client device 102. In an implementation, the PXE proxy 104 includes an image file determination module 118. The image file determination module 118 may query a web service 106 to determine which bootable image file 122 the client device 102 should receive.

In the case of a client device 102 running the Mac OS, a single image cannot support all hardware. As a result, different bootable image files 122 may be installed on different hardware platforms. A bootable image file 122 that works on one hardware platform may not work on another hardware platform.

The web service 106 may be a non-distributed service on the network 110 that the PXE proxy 104 may use to determine which bootable image file 122 to utilize for the client device 102. The web service 106 may have a hardware/bootable image file table 126 that is stored in a database. An administrator may map hardware characteristics of a client device 102 to a particular bootable image file 122. This mapping may be stored in the hardware/bootable image file table 126. Therefore, hardware with particular characteristics may be mapped to one bootable image file 122 while hardware with other characteristics may be mapped to another bootable image file 122, and so on.

The web service 106 may also have a default bootable image file indication 124. An administrator may choose a default bootable image file 122 to be used if a hardware-specific image is not provided by the hardware/bootable image file table 126.

The PXE proxy 104 may query the web service 106 to determine one of a plurality of bootable image files 122 that is mapped to the characteristics of the client device 102. The PXE proxy 104 may provide the characteristics obtained from the BSDP packets 112 to the web service 106. The web service 106 may perform a lookup operation using the characteristics of the client device 102 and the hardware/bootable image file table 126. This lookup operation may output which bootable image file 122 is mapped to the hardware of the client device 102 (or the default bootable image file indication 124 if no mapping is available).

The web service 106 may send a mapped bootable image file indication 120 to the PXE proxy 104. The mapped bootable image file indication 120 may be a message that instructs the PXE proxy 104 about which bootable image file 122 the client device 102 should receive. In an implementation, when a network booting request comes in on a PXE proxy 104 the PXE proxy 104 will query the web service 106 and get a full path to the appropriate bootable image file 122 for the client device 102 being booted.

Upon receiving the mapped bootable image file indication 120, the PXE proxy 104 may then check and see if all necessary files it needs to boot are already downloaded and up to date. For example, the PXE proxy 104 may determine whether it has the correct boot loader 116 associated with the mapped bootable image file indication 120. If not, the PXE proxy 104 may determine the nearest network location (e.g., server 108) to acquire the needed files and store them locally.

In another implementation, the PXE proxy 104 may send a response to the client device 102 that the mapped bootable image file 122 is available. If the client device 102 is mapped to a bootable image file 122 and the files download successfully at the PXE proxy 104, then the PXE proxy 104 may send the response to the client device 102. It should be noted that the response includes a single bootable image file 122. The response may include the path to the correct files to boot for that specific model of hardware. After the bootable image file 122 is listed at the client device 102 and the user or process decides to select that image, the PXE proxy 104 may respond to and service the network booting request, as described above.

With this approach, an administrator may post the bootable image files 122 in one place. The bootable image files 122 may then be replicated at one or more servers 108 in the network 110 to disburse the bootable image files 122 and any updates or changes to the bootable image files 122. However, the web service 106 may remain the only authoritative source of hardware to bootable image file 122 decisions. This approach provides real time updates from a centralized location when an administrator makes a change. The changes are quickly propagated to the servers 108 and PXE proxies 104 in the network 110.

To anyone or anything using this network booting service at the client device 102, it appears that there is only one network booting option (e.g., one bootable image file 122 available). In reality, the administrator has already made the decision so the desired results will already be made. This approach presents one logical bootable image file 122 that dynamically and intelligently serves the correct image based on the administrator's decisions. In other words, with this implementation, a single network booting option can be displayed at the client device 102 that will appear to be one bootable image file 122 to anyone or anything using the process, but behind the scenes, the correct bootable image file 122 is chosen that matches what the system administrator wants. This means the administrator keeps control and the user or technician running the process has a much easier process to use.

The web service 106 may provide all the information needed for the PXE proxy 104 to dynamically download the required network booting files (e.g., boot loader 116) and service the network booting request. The web service 106 may facilitate this decision even for new hardware types and/or a new bootable image file 122 of which the PXE proxy 104 and/or server 108 knew nothing beforehand. This facilitates network booting to be deployed in a zero-knowledge environment. The network booting may be dynamically configured and setup in real time as needed.

Figure 2:
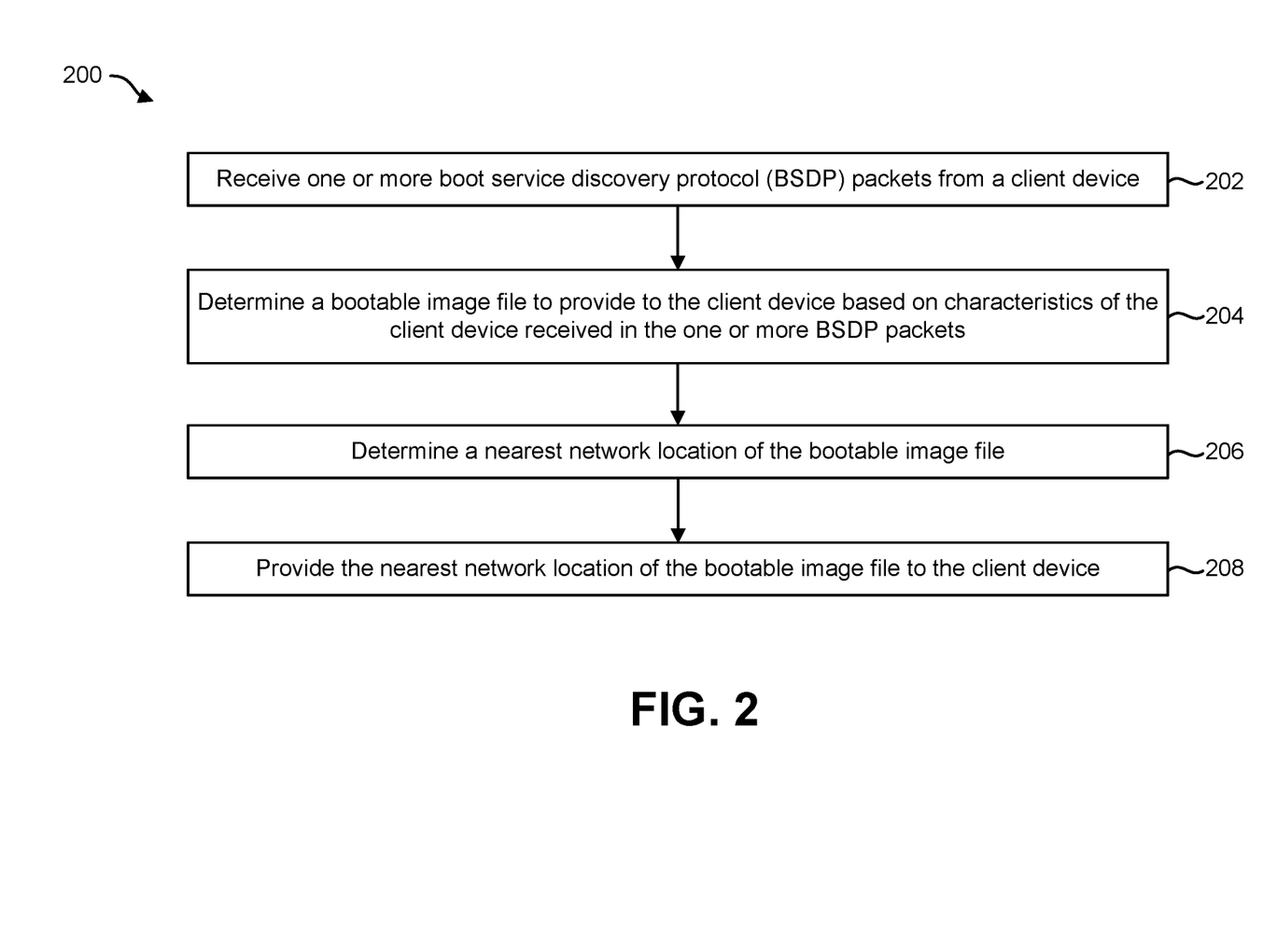
FIG. 2 is a flow diagram illustrating one configuration of a method for network booting.

FIG. 2 is a flow diagram illustrating one configuration of a method 200 for network booting. The method 200 may be implemented by a PXE proxy 104. The PXE proxy 104 may receive 202 one or more boot service discovery protocol (BSDP) packets 112 from a client device 102. The client device 102 may be a desktop computer, laptop computer, tablet computer, smartphone, printer, etc. In an implementation, the client device 102 may be a computer that is configured to run a Mac OS. The client device 102 may send the one or more BSDP packets 112 when it powers up or is restarted.

The one or more BSDP packets 112 may include characteristics of the client device 102. For example, the one or more BSDP packets 112 may indicate the hardware version of the client device 102.

The PXE proxy 104 may determine 204 a bootable image file 122 to provide to the client device 102 based on the characteristics of the client device 102 received in the one or more BSDP packets 112. In an implementation, the PXE proxy 104 may query a web service 106 to determine one of a plurality of bootable image files 122 that is mapped to the characteristics of the client device 102. This may be accomplished as described in connection with FIG. 1.

The PXE proxy 104 may determine 206 a nearest network location of the bootable image file 122. The nearest network location may be a HTTP server 108 or an NFS server 108 that hosts the bootable image file 122 and has a shortest ping time from the PXE proxy 104. For example, the PXE proxy 104 may send a ping request (e.g., echo request packet) to a number of servers 108 that the PXE proxy 104 knows host the bootable image file 122. The PXE proxy 104 then measures the roundtrip time to receive a ping response (e.g., echo reply) from one or more servers 108. The server 108 that has the ping response with the shortest roundtrip time is considered to be the nearest network location for the bootable image file 122.

The PXE proxy 104 may provide 208 the nearest network location of the bootable image file 122 to the client device 102. Upon determining which server 108 is the nearest network location for the bootable image file 122, the PXE proxy 104 may perform domain name system (DNS) resolution on behalf of the client device 102 to determine the internet protocol (IP) address of that server. The PXE proxy 104 may send the IP address of the server 108 to the client device 102.

Figure 3:
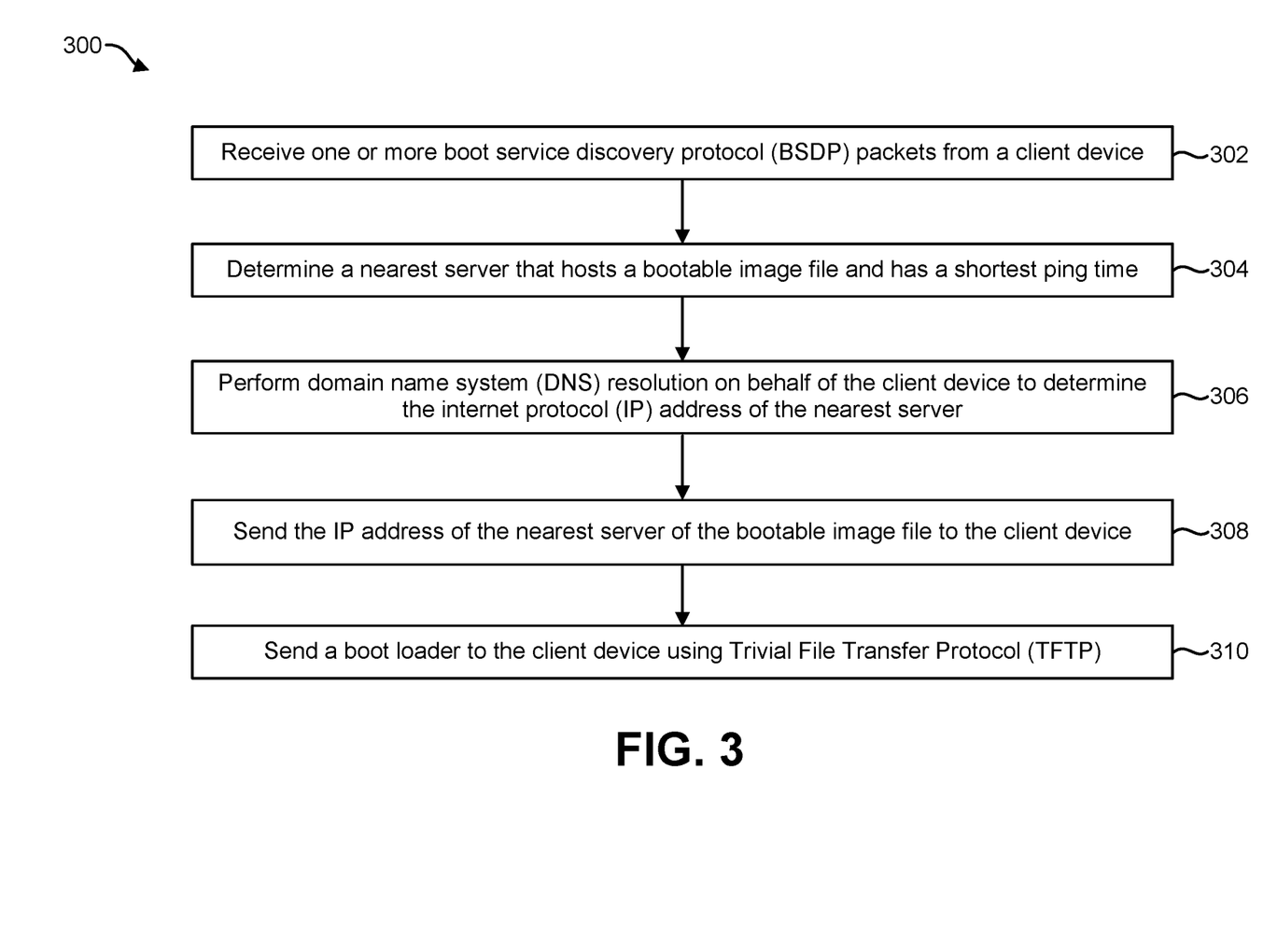
FIG. 3 is a flow diagram illustrating a detailed configuration of a method for network booting.

FIG. 3 is a flow diagram illustrating a detailed configuration of a method 300 for network booting. The method 300 may be implemented by a PXE proxy 104. In an implementation, the PXE proxy 104 is a Windows OS device.

The PXE proxy 104 may receive 302 one or more boot service discovery protocol (BSDP) packets 112 from a client device 102. The client device 102 may be a desktop computer, laptop computer, tablet computer, smartphone, printer, etc. In an implementation, the client device 102 may be a Macintosh client. The client device 102 may send the one or more BSDP packets 112 when it powers up or is restarted.

The one or more BSDP packets 112 may include characteristics of the client device 102. For example, the one or more BSDP packets 112 may indicate the hardware version of the client device 102.

The PXE proxy 104 may determine which bootable image file 122 to provide to the client device 102 based on characteristics of the client device 102 included in the one or more BSDP packets 112. This may be accomplished as described in connection with FIG. 4. In an implementation, the bootable image file 122 is a netboot image file.

The PXE proxy 104 may determine 304 a nearest server 108 that hosts a bootable image file 122 for the client device 102. The server 108 with the shortest ping time may be considered the nearest network location for the bootable image file 122. In an implementation, the PXE proxy 104 may have a list of HTTP and NFS servers 108 that host the bootable image file 122. The PXE proxy 104 may send a ping request to the servers 108 included in this list. The server 108 that sends a ping reply with the shortest round trip time may be the nearest network location for the bootable image file 122.

The PXE proxy 104 may then perform 306 domain name system (DNS) resolution on behalf of the client device 102 to determine the IP address of the nearest server 108. Upon determining the IP address of the nearest server 108, the PXE proxy 104 may send 308 the IP address of the nearest server 108 to the client device 102.

The PXE proxy 104 may send 310 a boot loader 116 to the client device 102 using TFTP. The PXE proxy 104 may determine whether it has a current version of the boot loader 116 for the bootable image file 122. If needed, the PXE proxy 104 may download an updated boot loader 116. The PXE proxy 104 may use a MTFTP service to send 310 the boot loader 116 to the client device 102.

Figure 4:
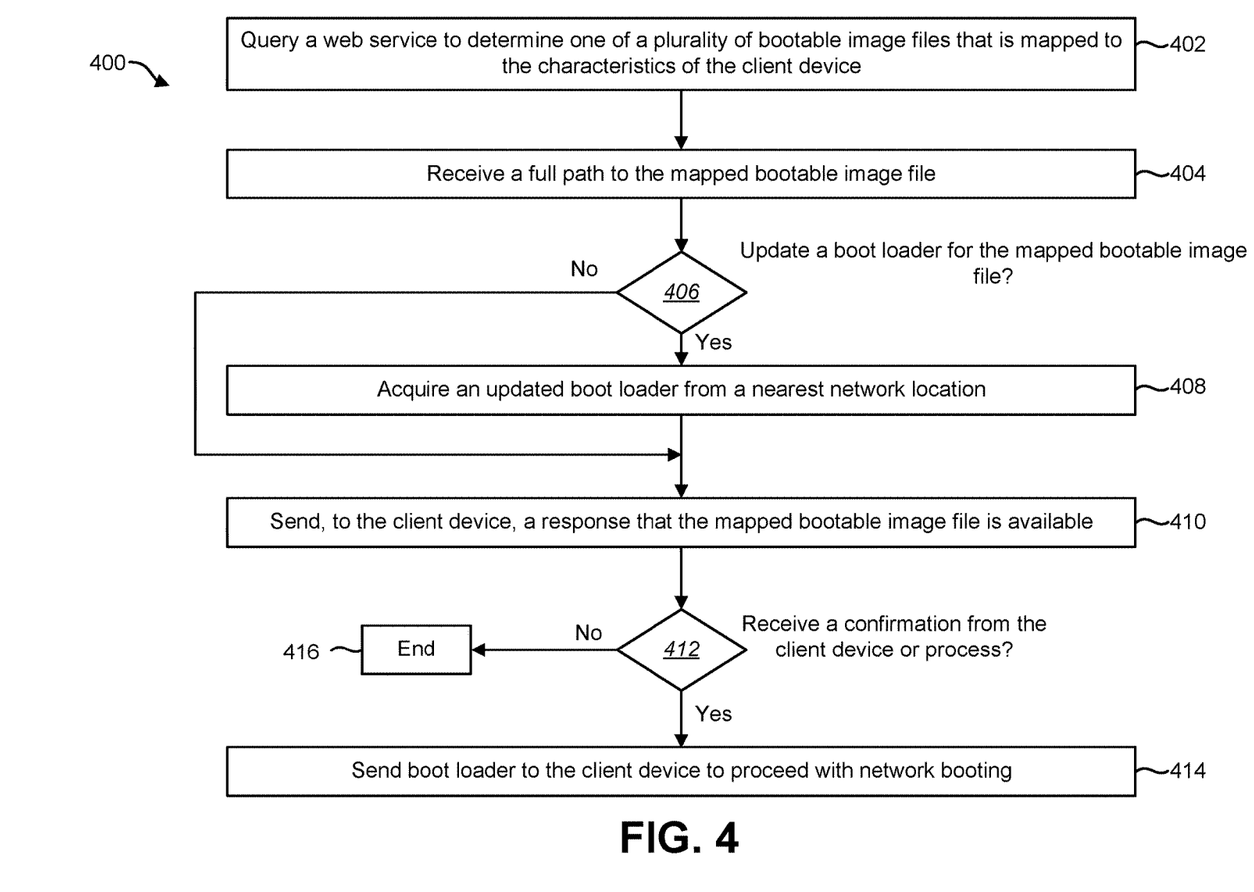
FIG. 4 is a flow diagram illustrating another detailed configuration of a method for network booting.

FIG. 4 is a flow diagram illustrating another detailed configuration of a method 400 for network booting. The method 400 may be implemented by a PXE proxy 104. In an implementation, the PXE proxy 104 is a Windows OS device.

The PXE proxy 104 may receive one or more boot service discovery protocol (BSDP) packets 112 from a client device 102. For example, the client device 102 may send the one or more BSDP packets 112 when it powers up or is restarted. The one or more BSDP packets 112 may include characteristics of the client device 102. These characteristics may indicate the hardware version of the client device 102.

The PXE proxy 104 may query 402 a web service 106 to determine one of a plurality of bootable image files 122 that is mapped to the characteristics of the client device 102. The PXE proxy 104 may provide the characteristics obtained from the BSDP packets 112 to the web service 106. The web service 106 may perform a lookup operation using the characteristics of the client device 102 to determine which bootable image file 122 is mapped to the hardware of the client device 102 (or the default bootable image file indication 124 if no mapping is available).

The PXE proxy 104 may receive 404 a full path to the mapped bootable image file 122 from the web service 106. The web service 106 may store the full path on the network 110 to the bootable image files 122 hosted by the servers 108. Upon determining which bootable image file 122 maps to the client device 102, the web service 106 may send the full path of the mapped bootable image file 122 to the PXE proxy 104. In an implementation, the web service 106 may send a mapped bootable image file indication 120 to the PXE proxy 104.

The PXE proxy 104 may determine 406 whether to update a boot loader 116 for the mapped bootable image file 122. The PXE proxy 104 may store one or more boot loaders 116 in local memory. When the PXE proxy 104 receives the mapped bootable image file indication 120, the PXE proxy 104 may determine whether the boot loader 116 for that bootable image file 122 is current.

If the PXE proxy 104 needs to update the boot loader 116, then the PXE proxy 104 may acquire 408 the boot loader 116 from a nearest network location. For example, the PXE proxy 104 may ping one or more servers 108 to determine which server 108 has the shortest ping time. The PXE proxy 104 may then download an updated boot loader 116 from the nearest server 108.

Upon acquiring 408 the updated boot loader (or determining 406 that no update is needed), the PXE proxy 104 may send 410 a response to the client device 102 that the mapped bootable image file is available. If the client device 102 is mapped to a bootable image file 122 and the files download successfully (e.g., boot loader 116) at the PXE proxy 104, then the PXE proxy 104 may send the response to the client device 102. The response may include the path to the correct files to boot for that specific model of hardware.

The PXE proxy 104 may determine 412 whether a confirmation has been received from the client device 102. After the bootable image file 122 is listed at the client device 102, a confirmation may be sent to the PXE proxy 104 if the user or process decides to select that bootable image file 122 for network booting. Upon receiving the confirmation, the PXE proxy 104 may send 414 the boot loader 116 to the client device 102 to proceed with network booting. The PXE proxy 104 may use TFTP to send the boot loader 116. The client device 102 may then acquire the bootable image file 122 using the path (e.g., IP address) to the server 108 hosting the bootable image file 122 provided in the response.

If the PXE proxy 104 determines 412 that a confirmation has not been received from the client device 102, then the method 400 may end 416. For example, if the PXE proxy 104 does not receive a confirmation from the client device 102 within a certain time period, or if the PXE proxy 104 receives a message from the client device 102 declining the bootable image file 122 presented in the response, the PXE proxy 104 may suspend further network booting operations.

Figure 5:
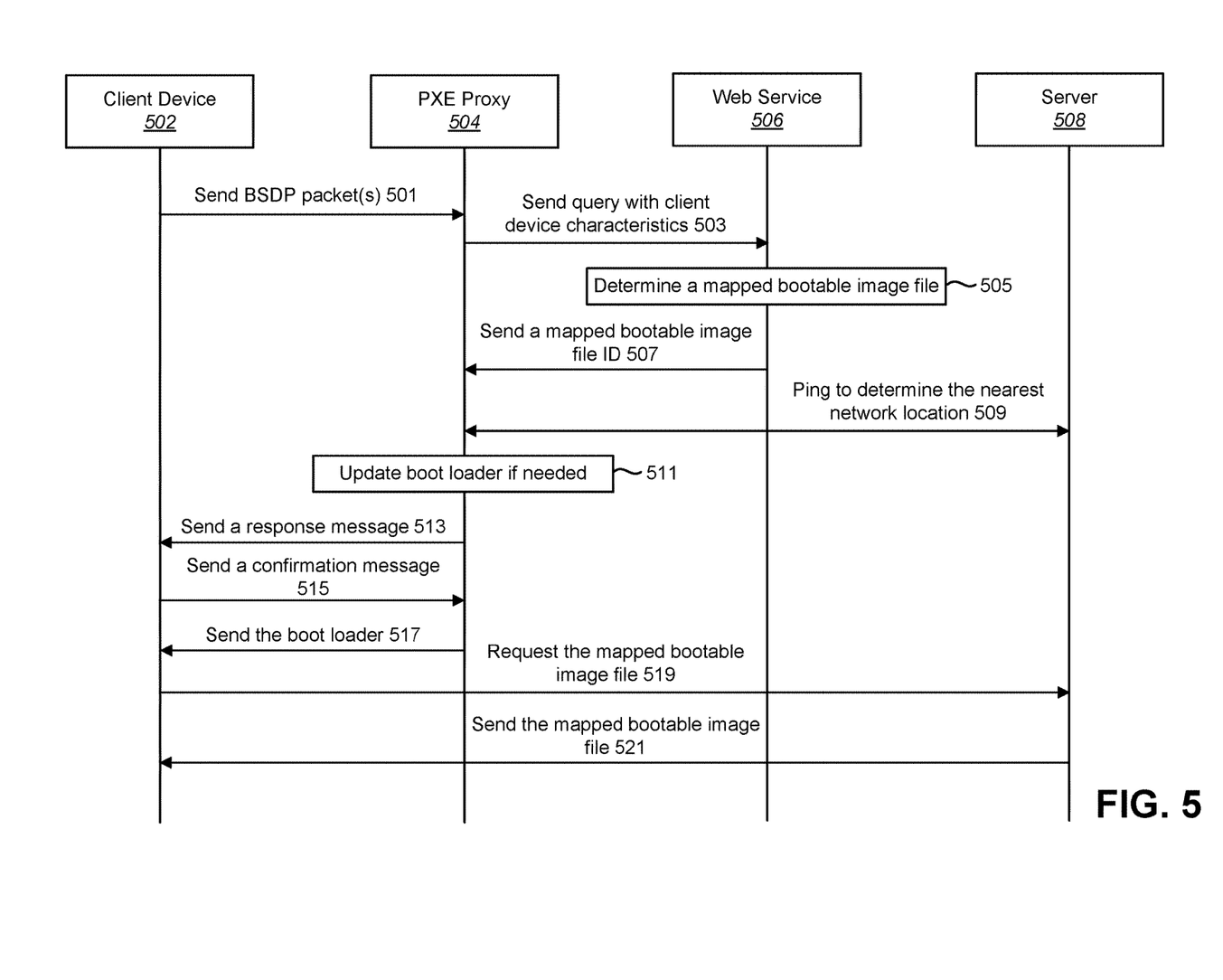
FIG. 5 is a sequence diagram illustrating various operations that may be performed in network booting.

FIG. 5 is a sequence diagram illustrating various operations that may be performed in network booting. One or more of a client device 502, a PXE proxy 504, a web service 506 and a server 508 may communicate on a network 110.

The client device 502 may send 501 one or more BSDP packets 112. For example, the client device 502 may send 501 the one or more BSDP packets 112 when it powers up or is restarted. The one or more BSDP packets 112 may include characteristics of the client device 502. For example, the one or more BSDP packets 112 may indicate the hardware version of the client device 502.

Upon receiving the one or more BSDP packets 112, the PXE proxy 504 may parse the BSDP packets 112 to determine the characteristics of the client device 502. The PXE proxy 504 may send 503 a query with the client device characteristics to the web service 506.

The web service 506 may determine 505 a mapped bootable image file 122 for the client device 502 based on the client device characteristics. For example, the web service 506 may perform a lookup in a hardware/bootable image file table 126 to determine which one of a plurality of bootable image files 122 is mapped to the hardware of the client device 502. If there is no match in the hardware/bootable image file table 126, then the web service 506 may select a default bootable image file 122 as the mapped bootable image file 122.

The web service 506 may send 507 a mapped bootable image file indication 120 to the PXE proxy 504. The mapped bootable image file indication 120 may identify which bootable image file 122 to use for the client device 502 and the path to one or more servers 508 that host the mapped bootable image file 122.

The PXE proxy 504 may perform 509 a ping operation with the one or more servers 508 to determine a nearest network location for the mapped bootable image file 122. The server 508 with the shortest ping time is considered the nearest network location for the mapped bootable image file 122.

The PXE proxy 504 may update 511 a boot loader 116 for the mapped bootable image file 122 if needed. For example, the PXE proxy 504 may determine whether it has a boot loader 116 for the mapped bootable image file 122 stored in local memory. If the stored boot loader 116 is not current (or if there is no boot loader 116 stored in memory), then the PXE proxy 504 may acquire an updated boot loader 116 from the nearest server 508.

The PXE proxy 504 may send 513 a response message to the client device 102 that the mapped bootable image file is available. The response message may include the path to the bootable image file 122 to boot for the specific model of hardware of the client device 502.

The client device 502 may send 515 a confirmation message to the PXE proxy 504. After the bootable image file 122 is listed at the client device 502, a confirmation message may be sent to the PXE proxy 104 if the user or process decides to select that bootable image file 122 for network booting.

Upon receiving the confirmation message from the client device 502, the PXE proxy 504 may send 517 the boot loader 116 to the client device 502. The client device 502 may request 519 the mapped bootable image file 122 from the server 508. The server 508 may send 521 the mapped bootable image file 122. In an implementation, the client device 502 may use HTTP or NFS to access the mapped bootable image file 122 on the server 508.

Figure 6:
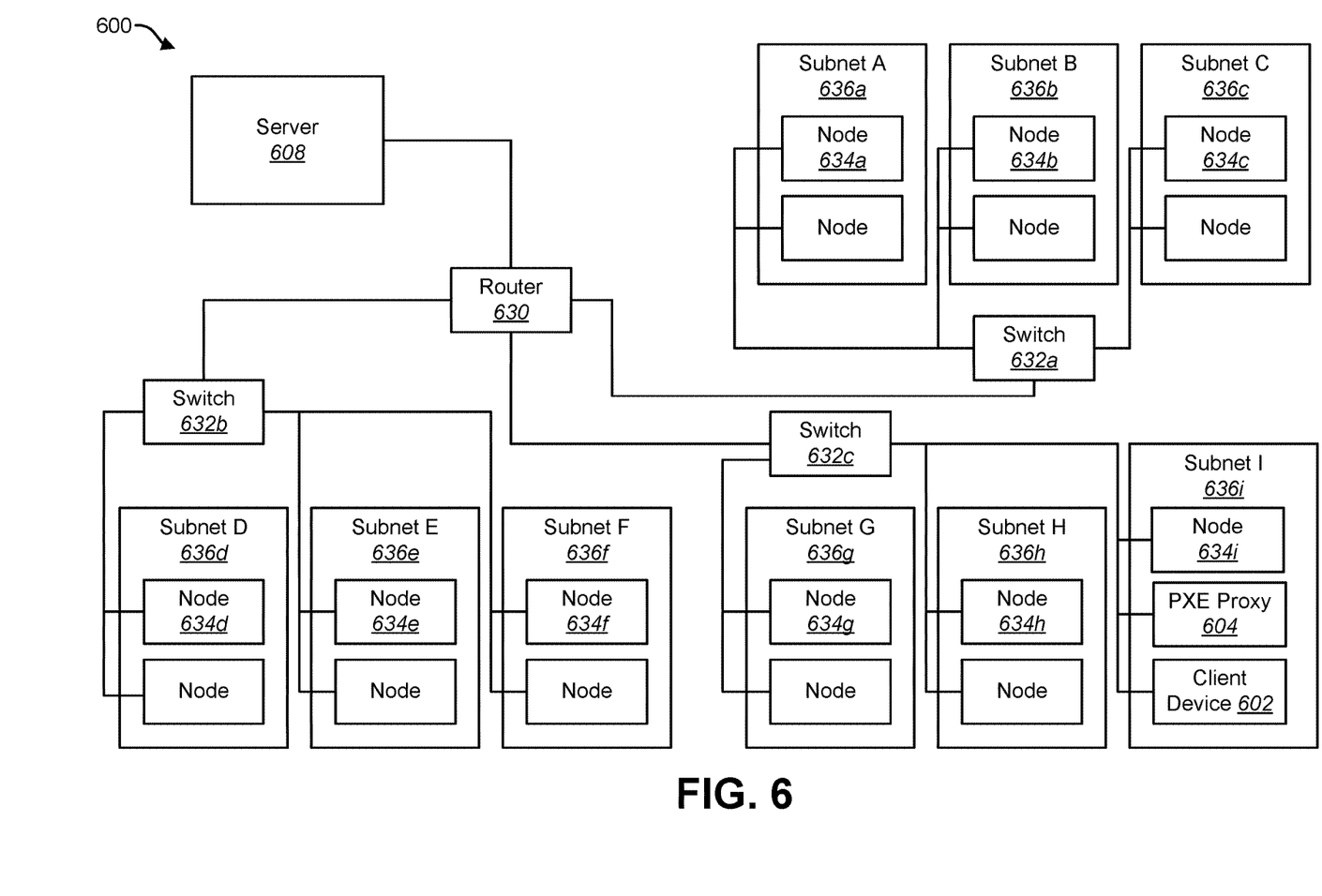
FIG. 6 is a block diagram that illustrates one configuration of a network where systems and methods for network booting may be implemented.

FIG. 6 is a block diagram that illustrates one configuration of a network 600 where systems and methods for network booting may be implemented. A server 608 is connected to a router 630. The router 630 is connected to switches 632a, 632b, and 632c. The switch 632a is connected to several nodes 634a, 634b, 634c, etc., via their respective subnets 636a, 636b, and 636c. The switch 632b is connected to several nodes 634d, 634e, 634f, etc., via their respective subnets 636d, 636e, and 636f. The switch 632c is connected to several nodes 634g, 634h, 634i, etc., via their respective subnets 636g, 636h, 636i.

Although FIG. 6 only shows one router 630, and a limited number of switches 632, subnets 636 and nodes 634, many and varied numbers of routers 630, switches 632, subnets 636 and nodes 634 may be included in networks and/or systems that may implement systems and methods network booting.

It should be noted that one or more of the nodes 634a-i may be examples of one or more of the client devices 102 and 502 or PXE proxies 104 and 504 described herein. In an example, a client device 602 and a PXE proxy 604 are included in subnet I 636i. Any number of client devices 602 and/or PXE proxies 604 may be included in one or more of the subnets 636a-i. The server 608 may host the bootable image file 122 described in connection with FIG. 1. Furthermore, this server 608 or another server 608 may provide the web service 106 described in connection with FIG. 1.

Figure 7:
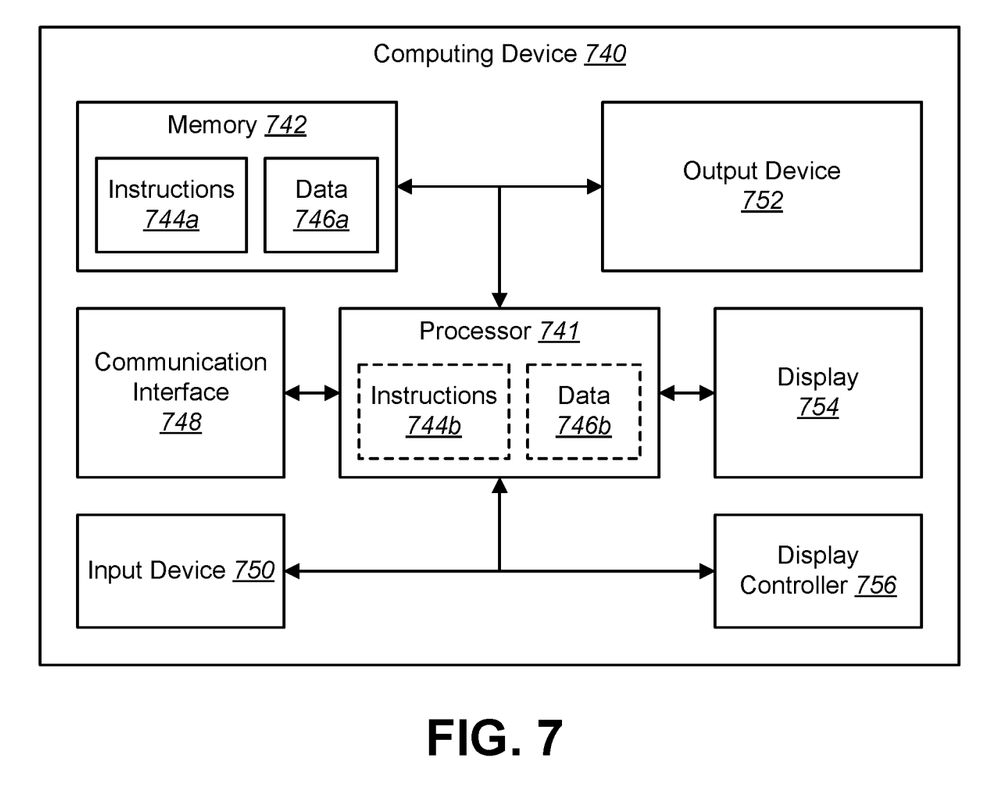
FIG. 7 illustrates various components that may be utilized in a computing device.

FIG. 7 illustrates various components that may be utilized in a computing device 740. The computing device 740 may be configured in accordance with one or more of the client devices 102, 502, 602, PXE proxies 104, 504 and 604 and servers 108, 508, 608 described herein.

The computing device 740 may include a processor 741 and memory 742. The memory 742 may include instructions 744a and data 746a. The processor 741 controls the operation of the computing device 740 and may be, for example, a microprocessor, a microcontroller, a digital signal processor (DSP) or other device known in the art. The processor 741 typically performs logical and arithmetic operations based on program instructions 744b and/or data 746b received from the memory 742.

The computing device 740 typically may include one or more communication interfaces 748 for communicating with other electronic devices. The communication interfaces 748 may be based on wired communication technology, wireless communication technology or both. Examples of different types of communication interfaces 748 include a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter and so forth.

The computing device 740 typically may include one or more input devices 750 and one or more output devices 752. Examples of different kinds of input devices 750 include a keyboard, mouse, microphone, remote control device, button, joystick, trackball, touchpad, lightpen, etc. Examples of different kinds of output devices 752 include a speaker, printer, etc. One specific type of output device 752 that may be included in a computer system is a display device 754. Display devices 754 used with configurations disclosed herein may utilize any suitable image projection technology, such as liquid crystal display (LCD), light-emitting diode (LED), gas plasma, electroluminescence, a cathode ray tube (CRT) or the like.

A display controller 756 may also be provided, for converting data 746a stored in the memory 742 into text, graphics and/or moving images (as appropriate) shown on the display device 754. Of course, FIG. 7 illustrates only one possible configuration of a computing device 740. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available non-transitory tangible medium that can be accessed by a computer or processor. By way of example, and not limitation, a computer-readable medium may comprise RAM, ROM, EEPROM, CD-ROM or other optical disk storage, magnetic disk storage or other magnetic storage devices, removable flash drives or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server or other remote source using a coaxial cable, fiber optic cable, twisted pair, digital subscriber line (DSL) or wireless technologies such as infrared, radio, and microwave, then the coaxial cable, fiber optic cable, twisted pair, DSL or wireless technologies such as infrared, radio and microwave are included in the definition of transmission medium.

The methods disclosed herein comprise one or more steps or actions for achieving the described methods. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A method for network booting by a preboot execution environment (PXE) proxy, comprising:
   receiving, at the PXE proxy and from a client device, one or more boot service discovery protocol (BSDP) packets including information indicating characteristics of the client device;
   determining, at the PXE proxy, a bootable image file to provide to the client device based on the characteristics of the client device;
   determining, at the PXE proxy, a nearest network location of the bootable image file by sending, after the receiving the one or more BSDP packets and the determining the bootable image file to provide to the client device based on the characteristics of the client device, a ping request to a set of network locations that has the bootable image file, the nearest network location of the bootable image file being a network location that is from the set of network locations and that is nearer to the PXE proxy than each remaining network location from the set of network locations; and
   providing information associated with the nearest network location of the bootable image file to the client device.

2. The method of claim 1, further comprising sending, to the client device using Trivial File Transfer Protocol (TFTP), a boot loader configured to load the bootable image file.

3. The method of claim 1, wherein providing information associated with the nearest network location includes:

performing domain name system (DNS) resolution to determine an internet protocol (IP) address of the nearest network location of the bootable image file; and sending a message indicating the IP address of the nearest network location of the bootable image file to the client device.

4. The method of claim 1, further comprising receiving, at the PXE proxy, one or more ping responses from one or more network locations from the set of network locations, wherein the determining the nearest network location of the bootable image file is based on:

determining, for each network location from the one or more network locations, a time period between (1) when the ping request was sent by the PXE proxy to that network location and (2) when a ping response from that network location was received at the PXE proxy; and determining a network location from the one or more network locations that is associated with a time period that is less than a time period determined for each other network location from the one or more network locations.

5. The method of claim 1, wherein the bootable image file is a netboot image file, the client device is a Macintosh client, and the PXE proxy is a Windows operating system device.

6. The method of claim 1, wherein the determining the bootable image file to provide to the client device includes:

sending, to a web service, a query including the information indicating the characteristics of the client device such that the web service, in response to receiving the query, identifies the bootable image file based on the characteristics of the client device; and receiving, from the web service, information associated with the bootable image file in response to the query.

7. The method of claim 1, wherein the set of network locations is a first set of network locations, the method further comprising:

determining that the PXE proxy does not have a current version of a boot loader for the bootable image file;

acquiring, in response to the determining that the PXE proxy does not have the current version of the boot loader, the current version of the boot loader from a network location (1) from a second set of network locations having the current version of the boot loader and (2) nearer to the PXE proxy than each other network location from the second set of network locations; and sending the current version of the boot loader to the client device.

8. The method of claim 1, wherein the providing information associated with the nearest network location includes sending, to the client device, a response indicating that the bootable image file is available and including a network path to the nearest network location of the bootable image file.

9. The method of claim 1, wherein the client device is a first client device and the bootable image file is a first bootable image file, the method further comprising:

receiving, from a second client device, one or more BSDP packets including information indicating characteristics of the second client device; and determining, based on the characteristics of the second client device, a second bootable image file different from the first bootable image file to provide information associated with the second bootable image file to the second client device.

10. The method of claim 1, wherein the PXE proxy and the client device are located in a single subnet.

11. The method of claim 1, wherein the information indicating the characteristics of the client device includes information indicating hardware characteristics of the client device.

12. A preboot execution environment (PXE) proxy that is configured for network booting, comprising:

a processor;

memory in electronic communication with the processor; and instructions stored in the memory, the instructions being executable by the processor to:

receive, from a client device, one or more boot service discovery protocol (BSDP) packets including information indicating characteristics of the client device;

determine a bootable image file to provide to the client device based on the characteristics of the client device;

send, after the receiving the one or more BSDP packets and the determining the bootable image file to provide to the client device based on the characteristics of the client device, a ping request to a set of network locations that each has the bootable image file;

receive one or more ping responses from one or more network locations from the set of network locations;

determine a network location from the one or more network locations that is associated with a shortest time period between (1) when the ping request was sent to that network location and (2) when the ping response from that network location was received; and provide information associated with the network location to the client device.

13. The PXE proxy of claim 12, further comprising instructions executable to send, to the client device using Trivial File Transfer Protocol (TFTP), a boot loader configured to load the bootable image file.

14. The PXE proxy of claim 12, wherein the instructions executable to provide the information associated with the network location include instructions executable to:

perform domain name system (DNS) resolution to determine an internet protocol (IP) address of the network location; and send a message indicating the IP address of the network location to the client device.

15. The PXE proxy of claim 12, wherein the network location includes one of a hypertext transfer protocol (HTTP) server that hosts the bootable image file or a network file system (NFS) server that hosts the bootable image file.

16. The PXE proxy of claim 12, wherein the bootable image file is a netboot image file, the client device is a Macintosh client, and the PXE proxy is a Windows operating system device.

17. The PXE proxy of claim 12, wherein the instructions executable to determine the bootable image file to provide to the client device comprise instructions executable to:

send, to a web service, a query including the information indicating the characteristics of the client device such that the web service, in response to receiving the query, identifies the bootable image file based on the characteristics of the client device; and receive, from the web service, information associated with the bootable image file.

18. The PXE proxy of claim 12, wherein the set of network locations is a first set of network locations, the PXE proxy further comprising instructions executable to:
  determine that the PXE proxy does not have a current version of a boot loader for the bootable image file;
  acquire, in response to the determining that the PXE proxy does not have the current version of the boot loader, the current version of the boot loader from a network location (1) from a second set of network locations, (2) that is nearer to the PXE proxy than each other network location from the second set of network locations, and (3) having the current version of the boot loader; and
  send the current version of the boot loader to the client device.

19. The PXE proxy of claim 12, wherein the instructions executable to provide information associated with the network location include instructions executable to send, to the client device, a response indicating that the bootable image file is available and including a network path to the network location.

20. A non-transitory tangible computer-readable medium for network booting by a preboot execution environment (PXE) proxy, the computer-readable medium comprising executable instructions to:
  receive, at the PXE proxy and from a client device, one or more boot service discovery protocol (BSDP) packets including information indicating characteristics of the client device;
  determine, at the PXE proxy, a bootable image file to provide to the client device based on the characteristics of the client device;
  determine, at the PXE proxy, a nearest network location of the bootable image file by sending, after the receiving the one or more BSDP packets and the determining the bootable image file to provide to the client device based on the characteristics of the client device, a ping request to a set of network locations that has the bootable image file, the nearest network location being a network location from the set of network locations that is nearer to the PXE proxy than each remaining network location from the set of network locations; and
  provide information associated with the nearest network location of the bootable image file to the client device.

21. The non-transitory tangible computer-readable medium of claim 20, further comprising executable instructions to send, to the client device using Trivial File Transfer Protocol (TFTP), a boot loader configured to load the bootable image file.

22. The non-transitory tangible computer-readable medium of claim 20, wherein the executable instructions to determine the bootable image file to provide to the client device include executable instructions to:
  send, to a web service associated with an administrator, a query including the information indicating the characteristics of the client device such that the web service, in response to receiving the query, identifies the bootable image file to provide to the client device based on the characteristics of the client device; and
  receive, from the web service, information associated with the bootable image file.

\* \* \* \* \*